United States Patent [19]

Motomura et al.

[11] 4,289,184
[45] Sep. 15, 1981

[54] PNEUMATIC RADIAL TIRE FOR HEAVY LOAD VEHICLES INCLUDING IMPROVED BEAD PORTION REINFORCING CONSTRUCTION

[75] Inventors: Kenichi Motomura, Kodaira; Hikaru Tansei, Higashimurayama; Masaru Abe, Sayama, all of Japan

[73] Assignee: Bridgestone Tire Company Limited, Tokyo, Japan

[21] Appl. No.: 112,259

[22] Filed: Jan. 15, 1980

[30] Foreign Application Priority Data

Feb. 20, 1979 [JP] Japan ............................ 54/20394[U]

[51] Int. Cl.³ .............................................. B60C 15/06
[52] U.S. Cl. .............................. 152/354 R; 152/362 R; 152/362 CS
[58] Field of Search ............... 152/353, 354, 355, 356, 152/357, 362

[56] References Cited

U.S. PATENT DOCUMENTS

| 3,921,693 | 11/1975 | Suzuki et al. | 152/354 R |
| 3,982,580 | 9/1976 | Inoue et al. | 152/361 R |
| 4,046,183 | 9/1977 | Takahashi et al. | 152/362 R |
| 4,185,677 | 1/1980 | Motomura | 152/362 R |
| 4,209,050 | 6/1980 | Yoshida et al. | 152/354 R |
| 4,214,620 | 7/1980 | Mezzanotte | 152/362 R |

Primary Examiner—John E. Kittle
Attorney, Agent, or Firm—Sughrue, Mion, Zinn, Macpeak & Seas

[57] ABSTRACT

A pneumatic radial tire for heavy load vehicles including an improved bead portion reinforcing construction constructed such that the cords of a reinforcing layer along the outside of a carcass ply are inclined on a circle formed by the upper end of a turn-up region of the carcass ply at an angle of 50° to 70° with respect to the radial plane of the tire and have an air gap ratio δ of 38% to 60% measured at a region where the cords of the reinforcing layer cross with a line tangent to a curved surface of a rim flange and extending in parallel with the rotary axis of the tire and given by the following formula $$\delta = \frac{b-c}{b} \times 100\%$$

where b is a distance between two midlines of two adjacent cords, measured perpendicular to the cords, and c is a cord diameter.

6 Claims, 3 Drawing Figures

PNEUMATIC RADIAL TIRE FOR HEAVY LOAD VEHICLES INCLUDING IMPROVED BEAD PORTION REINFORCING CONSTRUCTION

BACKGROUND OF THE INVENTION

1. Field of the Invention

This invention relates to pneumatic radial tires and more particularly to a pneumatic radial tire for heavy load vehicles such as trucks, buses or the like including an improved bead portion reinforcing construction.

2. Description of the Prior Art

A pneumatic radial tire for heavy load vehicles comprises at least one carcass ply wound around a bead core from the inside toward the outside thereof to form a turn-up region and composed of radially or semi-radially arranged cords. A rubber stiffener is interposed between the carcass ply and the turn-up region thereof and is substantially triangular in section, the rubber stiffener extending from the bead core outwardly in the radial direction of the tire. A strengthening layer is arranged along the turn-up region of the carcass ply and composed of at least one metal cord layer, and a reinforcing layer surrounding both the strengthening layer and the turn-up region of the carcass ply is composed of at least two organic fiber cord layers. The cords of one layer cross with the cords of the other layer. The reinforcing layer extends continuously from a height which is higher than both the outer upper end of the strengthening layer in the radial direction and the upper end of the turn-up region of the carcass ply to the inner surface of the carcass ply.

The pneumatic radial tire constructed as above described exhibits a significantly excellent effect of preventing a separation failure that is induced at the outer upper end of the turn-up region of the carcass ply, but tends to induce a separation failure between the organic fiber reinforcing layer and the sidewall rubber layer. The use of techniques for improving the separation resistant property between the organic fiber reinforcing layer and the sidewall rubber layer results in degradation of the separation resistant property at the outer upper end of the turn-up region of the carcass ply. Then, the above two measures contradict each other.

Many attempts have been made to overcome such contradiction, but hitherto none has led to fully satisfactory results.

SUMMARY OF THE INVENTION

An object of the invention, therefore, is to provide a highly durable pneumatic radial tire for heavy load vehicles, which is provided with an organic fiber cord reinforcing layer wound around a bead core to form a loop-shaped portion, which can effectively prevent a separation failure that tends to be induced between the organic fiber reinforcing layer and the sidewall rubber layer without deteriorating the separation resistant property at the outer upper end of the turn-up region of the carcass ply, and which is less expensive and light in weight.

A feature of the invention is the provision in a pneumatic radial tire comprising at least one carcass ply wound around a bead core from the inside toward the outside thereof to form a turn-up region and composed of radially or semi-radially arranged cords. A rubber stiffener is interposed between the carcass ply and the turn-up region thereof and is substantially triangular in section. The rubber stiffener extends from the bead core outwardly in the radial direction of the tire. A strengthening layer is arranged along the turn-up region of the carcass ply and is composed of at least one metal cord layer, and a reinforcing layer surrounding both the strengthening layer and the turn-up region of the carcass ply is composed of at least two organic fiber cord layers. The cords of one layer crossing with the cords of the other layer with the reinforcing layer extending continuously from a height which is higher than both the outer upper end of the strengthening layer in the radial direction and the upper end of the turn-up region of the carcass ply to the inner surface of the carcass ply. Specifically, the cords of the reinforcing layer extending along the outside of the carcass ply are inclined on a circle formed by the upper end of the turn-up region of the carcass ply at an angle of 50° to 70° with respect to the radial plane of the tire and have an air gap ratio δ of 38% to 60% measured at a region where the cords of the reinforcing layer cross with a line tangent to a curved surface of a rim flange and extending in parallel with the rotary axis of the tire and given by the following formula $$\delta = \frac{b-c}{b} \times 100\%$$

where b is a distance between the two midlines of two adjacent cords, measured perpendicular to the cords and c is a cord diameter.

Further objects and features of the invention will be fully understood from the following detailed description with reference to the accompanying drawings, wherein:

DETAILED DESCRIPTION OF THE PREFERRED EMBODIMENTS

Figure 1:
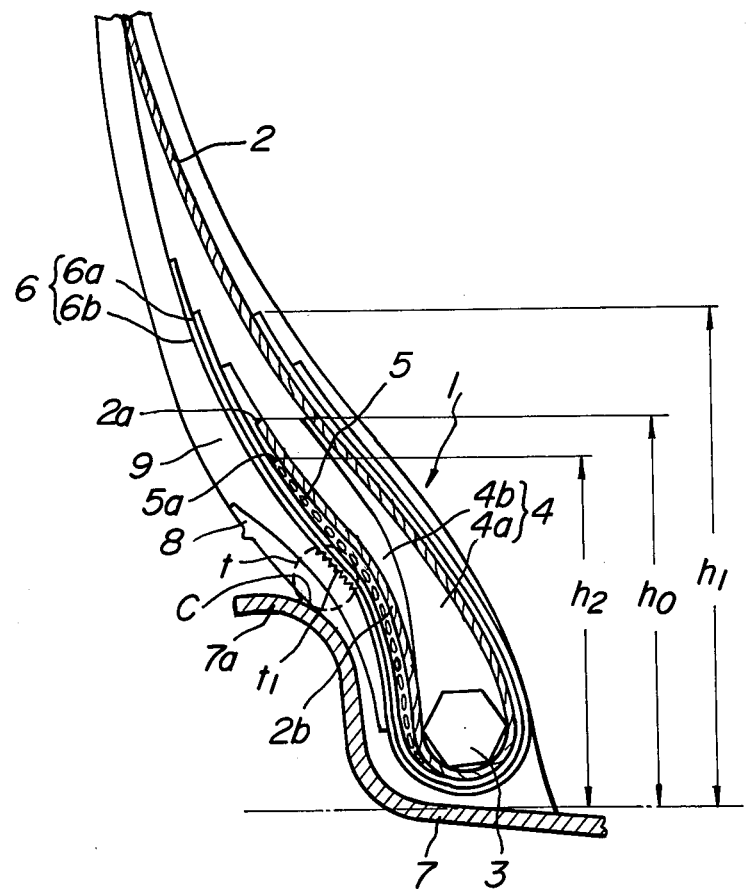
FIG. 1 is a cross-sectional view of essential parts of a tire embodying the present invention.
Figure 2:
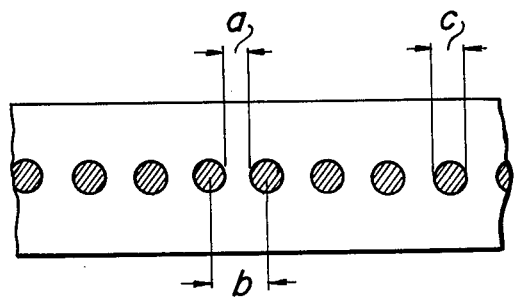
FIG. 2 is a cross-sectional view of the reinforcing layer of the tire shown in FIG. 1.

FIG. 1 shows the essential parts of a tire 1 embodying the invention in section. The tire 1 comprises a carcass ply 2 composed of cords, particularly metal cords and arranged in or inclined at an extremely small angle with respect to the radial plane of the tire 1. The carcass ply 2 is wound around a bead core 3 from the inside toward the outside thereof so as to form a turn-up region 2b terminating at an upper end 2a. Thus, the cords of the carcass ply 2 are radially or semi-radially arranged.

In the present embodiment shown in FIG. 1, the carcass ply 2 is composed of one single layer, but it may be composed of at least two layers.

Between the carcass ply 2 and the turn-up region 2b is interposed an inner core such as a rubber stiffener 4 composed of two portions 4a, 4b joined together. The rubber stiffener 4 is substantially triangular in section and extends outwardly in the radial direction of the tire 1 from the bead core 3. Along the turn-up region 2b of the carcass ply 2 is arranged a strengthening layer 5 composed of at least one metal cord. In addition, both the strengthening layer 5 and the turn-up region 2b of the carcass ply 2 are surrounded by a reinforcing layer 6 composed of organic fiber cords. In the present embodiment, the reinforcing layer 6 is composed of at least two layers, for example, and the cords of one layer are crossed with the cords of the other layer. The reinforcing layer 6 extends continuously from the outside of the carcass ply 2 to the inside thereof, that is, from a height $h_0$ of the upper end 2a of the turn-up region 2b of the carcass ply 2 which is higher than a height $h_2$ of the upper end 5a of the strengthening layer 5 to a height $h_1$ of the upper end of that part of the reinforcing layer 6 which extends along the inside of the carcass ply 2. The construction described above plays a role of effectively reinforcing the bead portion of the tire 1.

The above described construction exhibits a significantly excellent effect of preventing a separation failure to be induced at the upper end 2a of the turn-up region 2b of the carcass ply 2 of a tire for heavy load vehicles.

However, such kind of tire has a vital drawback that a separation failure is induced at that part of the sidewall rubber 9 which opposes a region c where a convex-shaped flange 7a of a rim 7 contacts a rubber chafer 8 of the bead portion when the tire runs under load and which is located near the boundary surface between the sidewall rubber 9 and the reinforcing layer 6. That is, the separation failure is induced at a portion t shown by a broken lines circle, more particularly at a portion shown by small indentations $t_1$.

It is now common practice to use the advantages of steel cord to utilize it as reproduced tires so many times for the purpose of substantially reducing the tire cost. In this case, the quality of the tires is dependent on the durability of the bead portion thereof. As a result, it is desirous to provide a highly durable bead portion reinforcing construction.

In the tire or the like assembled product composed of many kinds of members, if any one member becomes defective, the life of the tire or the like assembly as a whole is determined by the durability of the member concerned irrespective of the presence of the reinforced members.

As a result, the life of the tire is dependent on the fact that the various members as a whole are perfectly balanced with each other and are improved without exception.

An object of the invention, therefore, is to provide, in a bead construction comprising a reinforcing layer 6 composed of organic fiber cords and arranged around a bead core 3 as already described with reference to FIG. 1, a highly durable bead construction which can effectively prevent a separation failure that tends to be induced at the portion t facing to the convex-shaped flange 7a of the rim 7, particularly the portion $t_1$ near the boundary surface between the sidewall layer 9 and the reinforcing layer 6 without degrading the separation resistant property at the upper end 2a of the turn-up region 2b of the carcass ply 2. Such a bead construction is less expensive than in prior tires, light in weight and usable under heavy load.

In order to attain such object, inventors' analysis on the bead reinforcing construction shown in FIG. 1 has demonstrated the following result.

First, in the carcass, why the separation failure is induced at the portion t near the convex-shaped flange of the rim are as follows.

The rigidity of that portion of the reinforcing layer 6 which is located within a range from a position located near the convex-shaped flange 7a of the rim 7 to a position located at an inner portion in the radial direction is extremely large. Also, the cords of the reinforcing layer 6 near the portion t are subjected to little change from the tire molding step to the tire shaping step and hence are not disturbed. In addition, the number of the cords of the reinforcing layer 6 per unit length thereof is large, in other words, a cord air gap ratio to be described later of the reinforcing layer 6 is small. Moreover, the reinforcing layer 6 is wound around the carcass ply 2 from the inside toward the outside thereof, and as a result, the reinforcing layer 6 can uniformly withstand a large cord tension subjected thereto. Thus, the reinforcing layer 6 within the portion t is subjected to uniform and high tension, thereby increasing the rigidity of the reinforcing layer 6 per se.

As a result, a rigid dislocation occurs at the boundary surface $t_1$ between the sidewall rubber layer 9 and the reinforcing layer 6. In addition, the sidewall rubber layer 9 located at the portion t is compressed between the convex-shaped flange 7a of the rim 7 having a high rigidity and the reinforcing layer 6 having a high rigidity due to deformation of the tire every time the tire is rotated one turn. Consequently, the sidewall rubber layer 9 located at the portion t is pushed outwardly in the radial direction of the tire, thereby concentrating the shearing stress into the boundary surface $t_1$. Judging from this point of view, the conclusion is that it is preferable to make the rigidity of the reinforcing layer 6 small.

Secondly, the measure of reducing the separation failure to be induced at the upper end 2a of the turn-up region 2b of the carcass ply 2 is as follows.

Initially, it is necessary to improve the reinforcing effect near the upper end 2a of the turn-up region 2b of the carcass ply 2. For this purpose, it is necessary to improve the rigidity of the reinforcing layer 6 per se contrary to the first point of view. It is preferable, therefore, to make the cord tension acting in the reinforcing layer 6 large and uniform.

Investigations on the reinforcing layer 6 shown in FIG. 1 and more particularly on that part of the reinforcing layer 6 which is located near the upper end 2a of the turn-up region 2b of the carcass ply 2 have demonstrated that the cord tension becomes extremely nonuniform, that a large rigidity required is not obtained and that the reinforcing layer 6 does not exhibit a sufficiently large reinforcing effect.

Various examinations on such nonuniform tension have shown that nonuniform tension is influenced by the manufacturing method (molding method), cord pass length of the reinforcing layer 6, large inclined angle of the cords of the reinforcing layer 6 with respect to the carcass ply 2 and air gap ratio $\delta$ ($\delta=(b-c)/b$ where b is a distance between midlines of two adjacent cords measured perpendicular to the cords and c is a cord diameter).

In general, various rubbers and cord members are superimposed one upon the other on a cylinrical former and then are molded while shaping into a tire shape. In this case, use is made of a flat former which is somewhat high in height or the like due to the difference among a bias tire, radial tire, large size tire, small size tire or the like. The shaping step tends to increase the circumferential length of the reinforcing member including the cords.

The reinforcing member including the cords is permitted to effect the shaping step by means of the change of the inclined angle of the cords which is called pantagraph movement.

In general, the reinforcing layer 6 exhibits these conditions so the reinforcing layer 6 per se has a small air gap ratio, a large inclined angle with respect to the radial carcass ply and a long cord pass. The reinforcing layer 6 is substantially firmly fastened at a position near the bead core 3.

Any one of these conditions of the reinforcing layer 6 functions to prevent smooth pantagraphs movement thereof. In addition, the angular change of the cords of the reinforcing layer 6 must be made larger at those positions of the tire which are located outwardly in the radial direction of the tire from the bead base.

As a result, the pantagraph movement is hindered and the circumferential length of the reinforcing layer 6 is not smoothly increased. In the outer region of the cords in the reinforcing layer 6 in the radial direction of the tire, a phenomenon occurs where the reinforcing layer 6 is slidably moved downwardly toward the inside in the radial direction of the tire. As a result, the cords in each reinforcing layer tend to come nearer to each other in ununiform manner or to become overlapped with each other or to partially become wavy, thereby making the tension subjected to the cords of the reinforcing layer 6 extremely ununiform.

Based on such recognition, the inventors have made use of a reinforcing layer 6 formed of organic fiber cords and extending from a position covering both the upper end 2a of the turn-up region 2b of the carcass ply 2 and the upper end 5a of the strengthening layer 5 through the bead core 3 to the inside of the carcass ply 2. In addition, the inventors have investigated various conditions which can satisfy the above mentioned problem, that is, in the first place how to give a suitably balanced rigidity to the above mentioned portion t and particularly to the boundary surface shown by the portion t, to avoid the stress concentration and increase the separation resistant force and secondly how to increase and make uniform the cord tension of the reinforcing layer 6 at a position near the upper end 2a of the turn-up region 2b of the carcass ply 2 to increase the rigidity of the reinforcing layer 6 and hence exhibit the reinforcing effect. Such inventors' investigations have led to surprising result that the above mentioned two conditions contradictory to each other can be satisfied at the same time by the following measure.

That is, the above mentioned two conditions can be satisfied by optimizing the cord arrangement and air gap ratio $\delta$ of the reinforcing layer 6 formed of organic cords.

A feature of the invention, therefore, is the provision in a pneumatic radial tire comprising at least one carcass ply wound around a bead core from the inside toward the outside thereof to form a turn-up region and composed of radially or semi-radially arranged cords. A rubber stiffener is interposed between the carcass ply and the turn-up region thereof and is substantially triangular in section. The rubber stiffener extends from the bead core outwardly in the radial direction of the tire. A strengthening layer is arranged along the turn-up region of the carcass ply and composed of at least one metal cord layer, and a reinforcing layer surrounds both the strengthening layer and the turn-up region of the carcass ply and is composed of at least two organic fiber cord layers. The cords of one layer cross with the cords of the other layer with the reinforcing layer extending continuously from a position which is higher than both the outer upper end of the strengthening layer in the radial direction of the tire and the upper end of the turn-up region of the carcass ply to the inner surface of the carcass ply. Moreover, the cords of the reinforcing layer extending along the outside of the carcass ply are inclined on a circle formed by connecting the upper end of the turn-up region of the carcass ply at an angle of 50° to 70° with respect to the radial plane of the tire and have an air gap ratio $\delta$ measured at a region where the cords of the reinforcing layer cross with a line tangent to a convex surface of a rim flange and extending in parallel with the rotary axis of the tire and given by the following formula, $$\delta = \frac{b-c}{b} \times 100\%$$

where, b is a distance between two midlines of two adjacent cords measured perpendicular to the cords and c is a cord diameter.

In FIG. 1, the air gap ratio $\delta$ is measured at a position near a crossing point where a line tangent to the convex flange 7a of the rim 7 and extending in parallel with the rotary axis of the tire and the reinforcing layer 6 extending along the outside of the carcass ply 2 are crossed with each other. In the present invention, the air gap ratio $\delta$ is made within a range from 38% to 60%, preferably from 40% to 53%.

If the air gap ratio $\delta$ exceeds 60%, the reinforcing effect of the portion t becomes small and the rubber movement at the position near the portion t becomes large, thereby producing another problem. In addition, the absolute reinforcing effect at the position near the upper end 2a of the turn-up region 2b of the carcass ply 2 becomes decreased. It is preferable to make the air gap ratio $\delta$ smaller than 53%.

If the air gap ratio $\delta$ is smaller than 38%, the cord tension of the reinforcing layer 6 at the position near the upper end 2a of the turn-up region 2b of the carcass ply 2 becomes non-uniform owing to the problem inherent to the tire manufacture, thereby decreasing the reinforcing effect of the reinforcing layer 6. In addition, the rigidity of the reinforcing layer 6 at the portion t becomes excessively large and the separation resistant property of the reinforcing layer 6 becomes degraded. At the same time, rigidity dislocations at the boundary surface $t_1$ occur to concentrate the stress thereto, thereby degrading the separation resistant force. It is preferable to make the air gap ratio $\delta$ larger than 40%.

In addition, the cords of the reinforcing layer 6 are arranged on the premise that these cords are inclined on a circle formed by the upper end 2a of the turn-up portion 2b of the carcass 2 at an angle of 50° to 70°, preferably 58 to 62% with respect to the radial direction of the tire.

If the inclined angle of the cords of the reinforcing layer 6 is smaller than 50°, the reinforcing effect at the position near the upper 2a of the turn-up region 2b of the carcass ply 2 becomes decreased, while if the inclined angle of the cords of the reinforcing layer 6 exceeds 70°, the angular change in the case of shaping the tire becomes difficult and the cord tension becomes ununiform.

The invention will now be described with reference to a practical example.

In the present example, provision is made of a radial tire having a size of 10.00R20, 14PR. The tire comprises one radial carcass ply 2 wound around a bead core 3 from the inside toward the outside thereof to form a turn-up region 2b and two loop-shaped reinforcing layers 6 extending from a position arranged at the inside of the carcass ply 2 and located at a height $h_1 = 95$ mm in the radial direction of the tire through the bead core 3 to a position located at a height which is sufficient to surround both the upper end 2a of the turn-up region 2b of the carcass ply 2 and the upper end 5a of the strengthening layer 5. The cords of one of the two reinforcing layers 5 are crossed with the cords of the other layer. The reinforcing layer is composed of nylon cords. The reinforcing layer may also be composed of polyamide fiber cords.

The cords of the reinforcing layer 6 are inclined on a circle formed by the upper end 2a of the turn-up region 2b of the carcass ply 2 at an angle of 60° with respect to the radial direction of the tire. The reinforcing layer 6 has an air gap ratio $\delta$ of 46%. Each of the two reinforcing layers 6 is continuously wound around the bead core 3 from the outside toward the inside thereof to form a loop having two upwardly extending regions. It is necessary to provide at least two reinforcing layers 6 and to cross the cords of one of the two reinforcing layers with the cords of the other reinforcing layer for the purpose of improving the overall durability of the bead portion.

In addition, it is preferable that the cord diameter of the carcass ply 2, cord diameter of the strengthening layer 5 and cord diameter of the reinforcing layer 6 are so related that the cord diameter of these layers becomes smaller as their positions approach from the center bead core 3 to the outside thereof in the axial direction of the tire for the purpose of avoiding the stress concentration to each end of these three layers.

A stiffener 4, triangular in section, is a compound stiffener composed of a hard rubber layer 4a adjacent to the bead base and a soft rubber layer 4b located outside in the radial direction of the tire.

Figure 3:
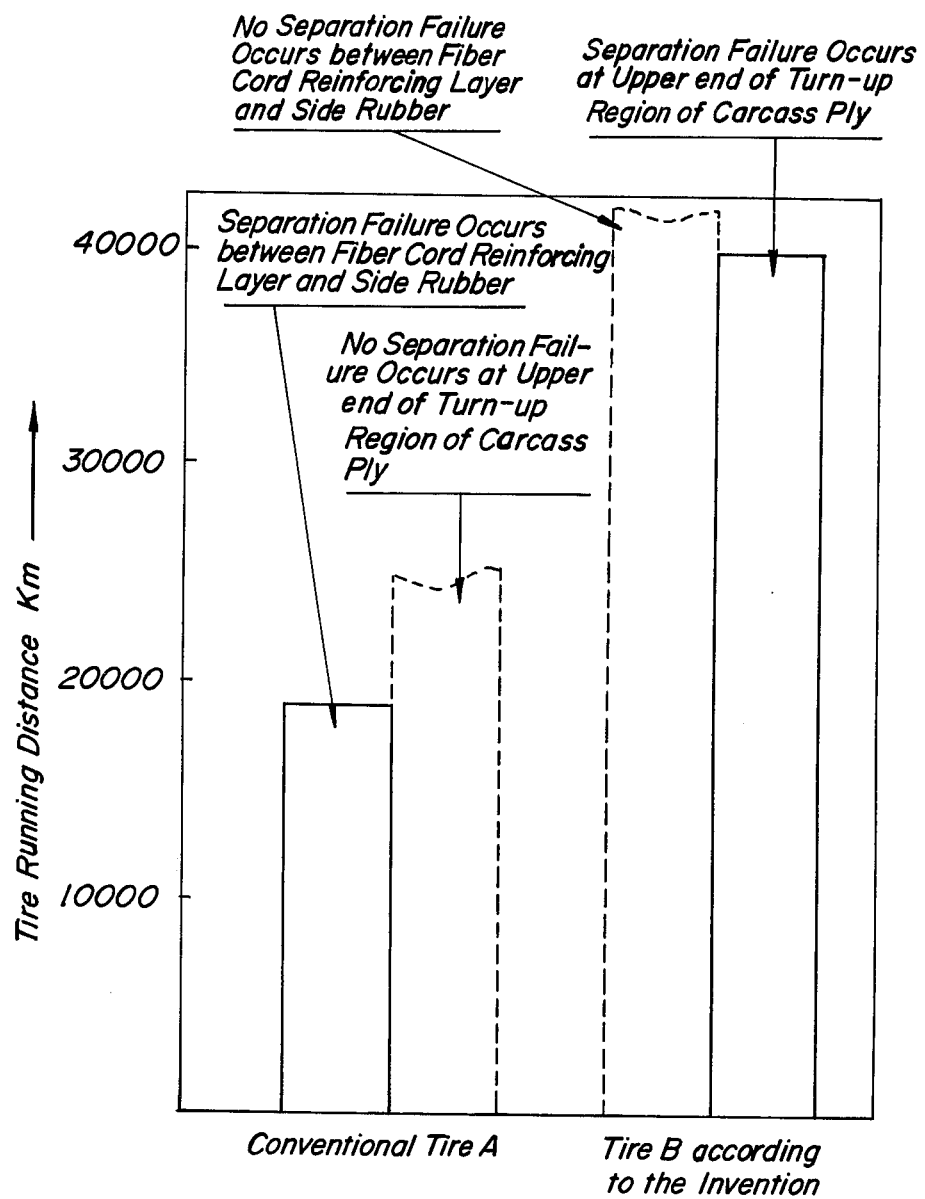
FIG. 3 is a diagram showing indoor drum running test results of the tire shown in FIG. 1 and that of a comparative conventional tire.

FIG. 3 shows indoor drum running test results of a conventional tire and a tire according to the invention. Both the tire run at a speed of 85 km/h under JIS 200% load.

In FIG. 3, on the ordinate is taken a running distance of a tire in km until separation failure occurs at both the boundary surface $t_1$ of the portion t and the upper end 2a of the turn-up region 2b of the carcass ply 2. A shows a conventional tire comprising a reinforcing layer 6 having an air gap ratio $\delta$ of 31%, the other constitutional elements being the same as those of a tire B according to the invention. The conventional tire A induced a separation failure at the boundary surface $t_1$ of the portion t at the end of running of 19,000 km so that it was impossible to ascertain whether or not a separation failure is induced at the upper end 2a of the turn-up region 2b of the carcass ply 2.

B shows a tire according to the invention comprising a reinforcing layer 6 having an air gap ratio $\delta$ of 46%.

The following Table 1 shows the construction of the conventional tire A and the tire B according to the invention.

TABLE 1

|  | A | B |
| --- | --- | --- |
| Number of cords per unit length of reinforcing layer | 56/50 mm | 44/50 mm |
| Inclined angle | 62° | 62° |
| Air gap ratio $\delta$ | 31% | 46% |

In the above Table 1, the values of the inclined angle and air gap ratio $\delta$ were measured under the condition as defined by the invention.

As can be seen from the indoor drum running test result shown in FIG. 3, the tire according to the invention induces no separation failure at the boundary surface $t_1$ of the portion t and induces a separation failure at the upper end 2a of the turn-up region 2b of the carcass ply 2 at the end of running distance of 40,000 km. This is because of the fact that as can be seen from the Table 1 the separation resistant force between the reinforcing layer 6 and the sidewall rubber layer 9 is large and that the rate of reducing the separation resistant force when the tire runs becomes small.

In the present invention, the use of the optimum air gap ratio $\delta$ of the reinforcing layer 6 ensures an increase of the separation resistant force and provides the important advantage that the boundary surface $t_1$ is prevented from subjecting to the stress concentration and that the rate of reducing the separation resistant force when the tire runs becomes small. In addition, the separation resistant force at the upper end 2a of the turn-up region 2b of the carcass ply is sufficiently large irrespective of the presence of the large air gap ratio $\delta$. As a result, the tire according to the invention has a durability which is 30% to 50% times higher than that of the conventional tire.

The following Table 2 shows a separation resistant force at the boundary surface $t_1$ of the portion t of a new tire according to the invention on the basis of the corresponding separation resistant force of the conventional tire assumed as 100 and also a separation resistant force at the same position after a given running (running over a distance of 120,000 km under a normal load) of the conventional tire as compared with that of the tire according to the invention.

TABLE 2

|  | Conventional tire | Tire according to the invention |
| --- | --- | --- |
| New tire | 100 | 130 |
| After given running | 50 | 95 |

The numerical values shown in the above Table 2 are those of the separation resistant force actually measured with the aid of a unit of kg/25 mm and indicated by index.

As can be seen from the Table 2, the tire according to the invention can effectively improve the separation resistant force thereof in accordance with decrease of the reducing the separation resistant force.

As stated hereinbefore, a pneumatic radial tire for heavy load vehicles including an improved bead portion reinforcing construction constructed according to the invention is capable of not only completely preventing a separation failure at a boundary surface $t_1$ between a sidewall rubber layer 9 and a reinforcing layer 6 but also significantly improving a separation resistant property at an upper end 2a of a turn-up region 2b of a carcass ply 2. This is contradictory to the first mentioned separation failure, and also capable of making the tire significantly less expensive and light in weight.

What is claimed is:

1. A pneumatic radial tire for heavy load vehicles including an improved bead portion reinforcing construction, comprising; at least one carcass ply wound around a bead core from the inside toward the outside thereof to form a turn-up region and composed of radially or semi-radially arranged cords, a rubber stiffener interposed between the carcass ply and the turn-up region thereof and substantially triangular in section, said rubber stiffener extending from the bead core outwardly in the radial direction of the tire, a strengthening layer arranged along the turn-up region of the carcass ply and composed of at least one metal cord layer, and a reinforcing layer surrounding both the strengthening layer and the turn-up region of the carcass ply composed of at least two organic fiber cord layers, the cords of one layer crossing with the cords of the other layer, said reinforcing layer extending continuously from a height which is higher than both the outer upper end of the strengthening layer in the radial direction and the upper end of the turn-up region of the carcass ply to the inner surface of the carcass ply, said cords of the reinforcing layer extending along the outside of the carcass ply and are inclined on a circle formed by the upper end of the turn-up region of the carcass ply at an angle of 50° to 70° with respect to the radial plane of the tire, said cords of the reinforcing layer have an air gap ratio $\delta$ to 38% to 60% measured at a region where they cross with a line tangent to a curved surface of a rim flange and extending in parallel with the rotary axis of the tire and given by:

$$\delta = \frac{b-c}{b} \times 100\%$$

where, b is a distance between the two midlines of two adjacent cords, measured perpendicular to the cords, and c is a cord diameter.

2. The pneumatic radial tire according to claim 1, wherein said cord angle of said reinforcing layer extending along the outside of said carcass ply is 58° to 62°.

3. The pneumatic radial tire according to claim 1, wherein said air gap ratio $\delta$ is 40% to 53%.

4. The pneumatic radial tire according to claim 1, wherein said reinforcing layer is composed of polyamide fiber cords.

5. The pneumatic radial tire according to claim 1, wherein respective diameters of said carcass ply cord, strengthening layer cord and reinforcing layer cord become smaller in the order as mentioned above.

6. The pneumatic radial tire according to claim 1, wherein said carcass ply is composed of metal cords.

* * * * *